(No Model.)
W. F. CARVER.
STAGE APPLIANCE.
No. 604,020.
2 Sheets—Sheet 1.
Patented May 17, 1898.
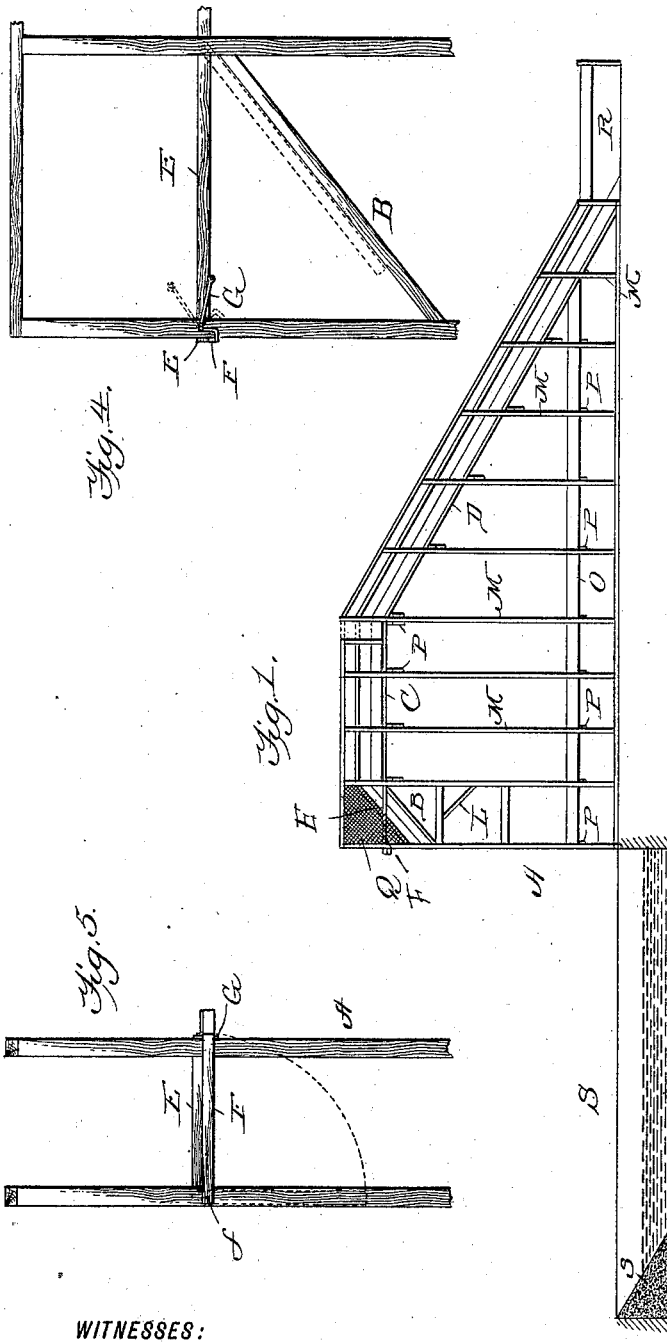
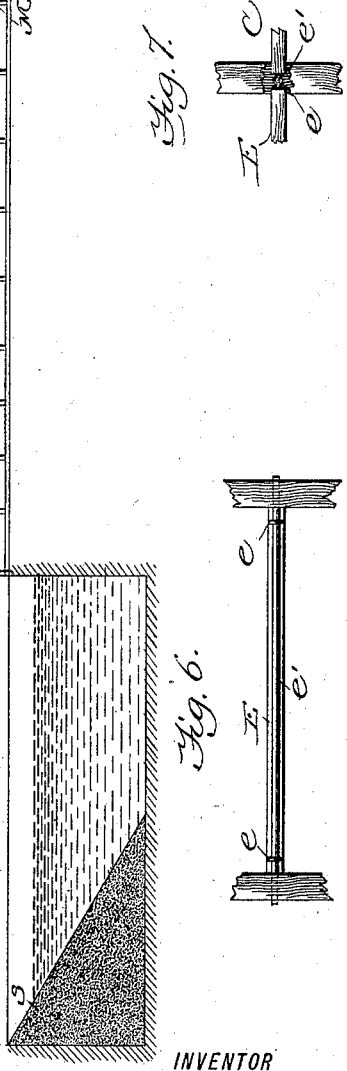
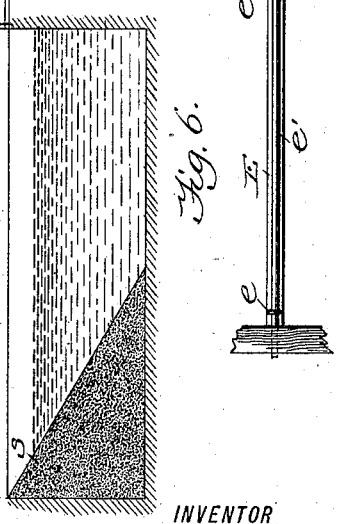
WITNESSES:
Harry S. Rolner
W. A. Redmond
INVENTOR
William F Carver
BY
J F Beale
ATTORNEY.

(No Model.) 2 Sheets—Sheet 2.
W. F. CARVER.
STAGE APPLIANCE.
No. 604,020. Patented May 17, 1898.
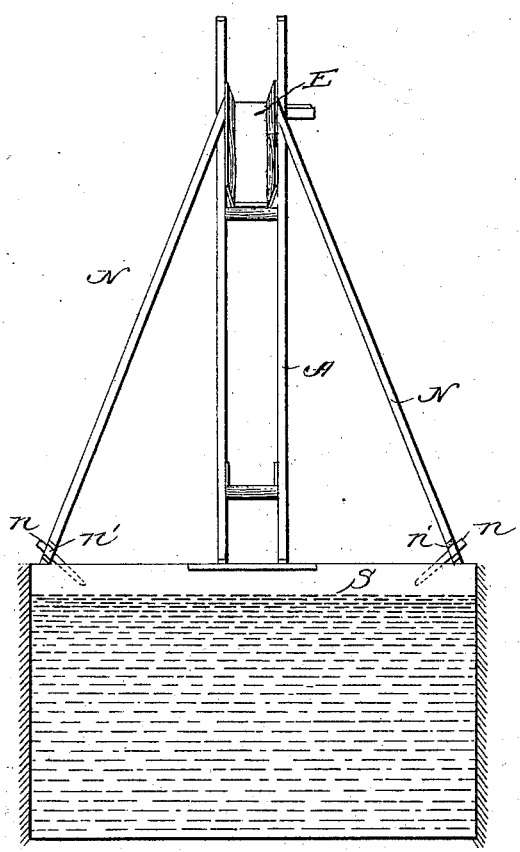
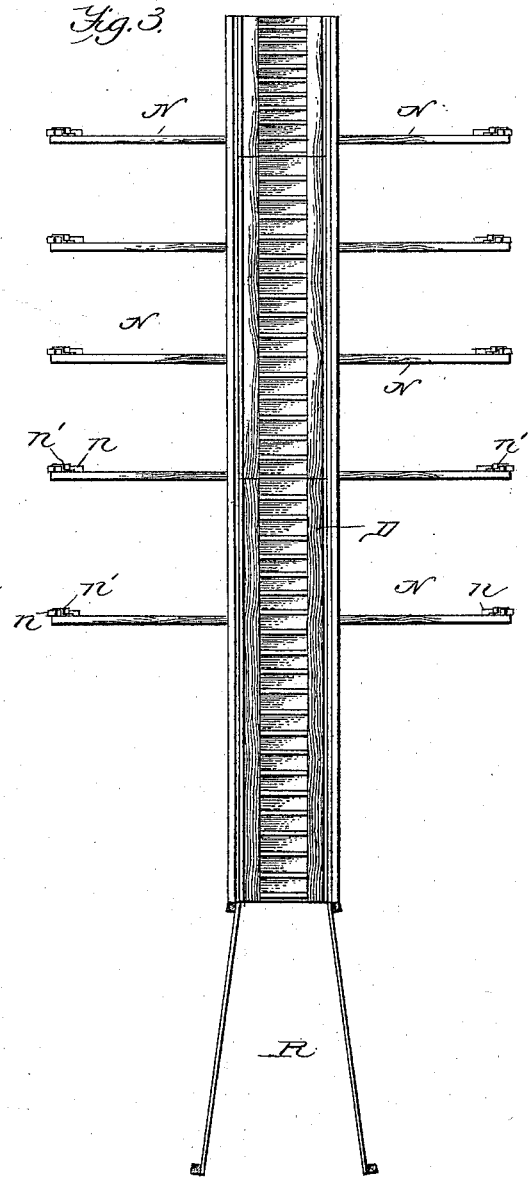
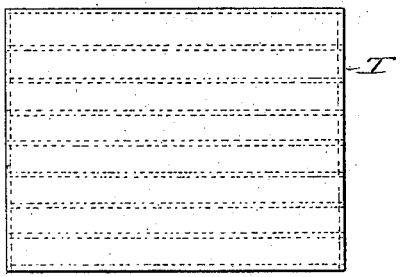
WITNESSES:
INVENTOR
William F. Carver
BY
J. F. Beale.
ATTORNEY.

UNITED STATES PATENT OFFICE.

WILLIAM F. CARVER, OF CHICAGO, ILLINOIS.

STAGE APPLIANCE.

SPECIFICATION forming part of Letters Patent No. 604,020, dated May 17, 1898.

Application filed May 28, 1896. Renewed April 7, 1898. Serial No. 676,830. (No model.)

*To all whom it may concern:*

Be it known that I, WILLIAM F. CARVER, a citizen of the United States, residing at Chicago, in the county of Cook and State of Illinois, have invented certain new and useful Improvements in Stage Appliances; and I do hereby declare the following to be a full, clear, and exact description of the invention, such as will enable others skilled in the art to which it appertains to make and use the same.

My invention relates to mechanical arrangements applicable to public places of amusement or for stage appliances of theaters to produce dramatic effect.

The object of my invention is to provide a structure and apparatus for giving public exhibitions either in the open air or in theaters to produce the dramatic effect of an animal diving head foremost from an elevation into a body of water at the base thereof.

It is also my object to provide a mechanical drop or trap adapted for training animals to acquire the skill of diving from an elevation into a body of water; also, to provide a novel form of tank to be used with said structure.

It will be understood that when my apparatus is used as a stage appliance for theaters it may be blended with the scenic effect or disguised and represented as a cliff or mountain side and the body of water as a river or lake.

In the accompanying drawings, forming a part of this specification, Figure 1 is a side elevation of my apparatus, showing an artificial lake in front of the same, with the trap or chute in normal position and the supports N removed. Fig. 2 is a front elevation with the trap or chute down. Fig. 3 is a plan elevation. Fig. 4 is an enlarged detail view of the trap or chute in side elevation. Fig. 5 is an enlarged detail view of the trap or chute in front elevation. Figs. 6, 7, and 8 are further detail views.

Referring more particularly to the drawings, A denotes a skeleton tower strongly braced, having a stationary inclined plane B, rigidly secured to the posts or uprights of the tower near its upper end. C denotes an oblong horizontal platform attached to the rear of the tower at the top of said incline and communicating therewith. D denotes a run or inclined way leading from the ground or stage level to the rear end of said platform. E denotes a movable chute or platform hinged to the rear post of said tower and in its normal position projects forwardly on a level with the platform C. *e e* denote two eyebolts secured to the rear end of the chute E and serve to hinge said chute to an iron rod *e'*, secured to the rear posts of said tower. The front or outer end of this chute rests on a bar F, and said bar is hinged at one end to the left-hand front post of the tower by a pivot-bolt *f*. G denotes a lever secured to the right-hand front post of said tower and provided with a crank-arm, which in its normal position supports the free end of the bar F, as shown in Fig. 4. The floor of the incline B, as shown in Fig. 4, slants downwardly at an angle of forty-five degrees, but this angle may be varied to meet requirements of a difference in the height of tower and size of water-receptacle at its front or for other purposes hereinafter stated. Where the height of tower is about twenty feet, the angle should be about forty-five degrees.

In constructing my apparatus I may use wood or iron, due regard being had to strength, lightness, or the uses to which it is to be put and the weight or kind of animal which takes part in the performance.

The upright supports forming the tower are arranged to form a square skeleton tower, which is braced by horizontal cross-braces, the upper one of which is larger and stronger, as it also serves to brace the incline B and support the uprights against the shock of impact of the hinged chute with the weight of the animal when its fall is arrested. As an additional brace to resist this impact I use a cross-tie L. The platform C and incline D are supported by uprights M, which are arranged close together under the platform.

N denotes diagonal braces secured to the ground or stage floor in any desirable manner. In Fig. 2 I have shown the lower ends of the braces provided with metal clips *n'*, through which pegs *n* are passed and driven into the earth.

O and P denote cross braces and ties connecting the uprights M.

Q denotes a wire-gauze fender inclosing the sides of the chute to prevent the animal from putting his head through the side of the same.

R denotes a wing attached to the sides of the incline and extending outward in the rear thereof.

S denotes a tank or artificial lake arranged in front of and at the foot of tower. The dimensions of said tank depend, of course, upon the size of animal and height of chute B. For an animal weighing about twelve hundred pounds and the height of chute about twenty feet the tank should be at least forty feet long, twenty feet wide, and twelve feet deep.

s denotes an upward incline, which extends from the bottom of the tank about midway of its length to the front wall thereof and serves as an exit for the animal.

T denotes a canvas lining designed to fit the bottom of the artificial lake and serves to prevent leakage where the soil is loose or sandy, and also to prevent the animal from stalling or sticking.

The incline D and platform C are preferably sheathed in at the sides, forming a continuous run or way leading the animal to the movable chute E. The floor of the incline and movable chute may be provided with cleats to prevent the animal slipping.

The animal is lead or driven up the incline and over the platform onto the movable chute E. At a given signal an operator, who may be concealed, raises the handle end of the lever and causes the crank-arm to release the pivoted bar F, which immediately swings from under the chute. The outer end of the chute being thus released, it falls, with the animal, upon the incline B, where it is suddenly checked. The inertia caused by the weight of the animal falling being thus suddenly checked upon an incline plane causes the animal to lose its center of gravity and compels it to jump or dive head foremost into the tank or lake, from which it ascends by means of the incline s.

In training animals to dive, the chute may be given greater or less fall, depending upon the nature and weight of the animal, or just sufficient to cause the animal to lose its center of gravity, in which instance the animal, finding it cannot retain its balance on the chute, will immediately dive into the water.

It will be seen that my apparatus may be used for training animals to dive, or, where from the nature of the animal it cannot be so taught, to compel it to dive head foremost into the water.

Having thus described my invention, what I claim, and desire to secure by Letters Patent, is—

1. An apparatus or stage appliance consisting of an elevated platform having a downward and outward incline leading from the forward end of said platform to a body of water arranged below and in front of said incline, a chute hinged by its inner end contiguous to said platform and projecting in front of the same and over the incline at its forward end, means for supporting the outer end of said chute and means for releasing said end and causing said chute to fall in contact with said forward incline substantially as shown and described.

2. An apparatus or stage appliance consisting of an elevated platform having an inclined way leading from the ground or stage level to the rear end thereof, a downward and outward incline leading from the forward end of said platform to a body of water arranged below and in front of said latter incline, a chute hinged by its inner end contiguous to said platform and projecting in front of the same and over the incline at its forward end, means for supporting the outer end of said chute and means for releasing said end and causing said chute to fall in contact with said forward incline, substantially as shown and described.

3. An apparatus consisting of a horizontal platform a run or way leading to said platform a tower built in front of said platform, having an incline platform the upper end of which meets the forward end of said platform, a body of water at the foot of the forward end of said tower a chute hinged by its rear end to the rear upper portion of said tower and forming when in its normal position a continuation of said horizontal platform, a support pivoted to said tower and upholding the outer or free end of said chute when in its normal position, and means for releasing said support and swinging said chute downwardly upon said incline platform, substantially as shown and described.

4. An apparatus consisting of an elevated horizontal platform an inclined way leading to the rear end thereof, a horizontal chute forming a continuation of said horizontal platform, its rear end being hinged and its forward end resting upon a cross-bar immediately above a body of water; the cross-bar pivoted at one end, its free end resting when in its normal position, upon a crank-arm and a lever for operating said crank-arm to release the free end of said bar, substantially as shown and described.

In testimony whereof I affix my signature in presence of two witnesses.

WILLIAM F. CARVER.

Witnesses:
GEORGE W. RODGERS,
MAX W. HEINRICHS.